Aug. 25, 1942.       C. B. SCHAFER       2,293,858
APPARATUS FOR WASHING SHEET GLASS
Filed Jan. 25, 1941        2 Sheets-Sheet 1
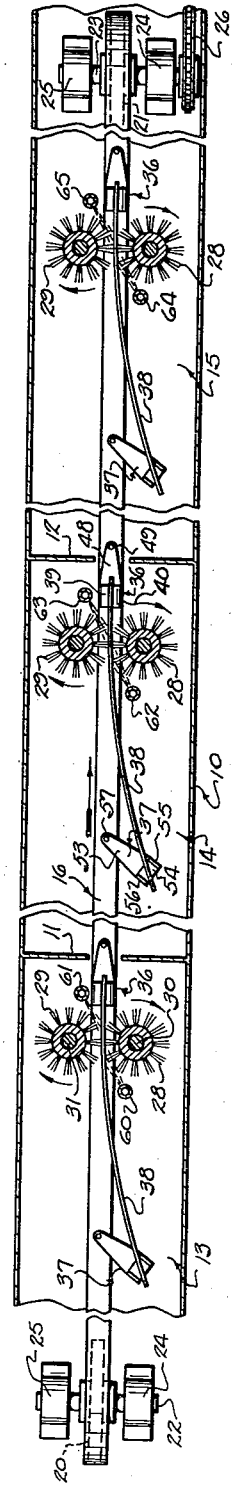
Inventor
CONRAD B. SCHAFER.
By
Frank Fraser
Attorney Aug. 25, 1942.          C. B. SCHAFER                 2,293,858
APPARATUS FOR WASHING SHEET GLASS
Filed Jan. 25, 1941                2 Sheets-Sheet 2
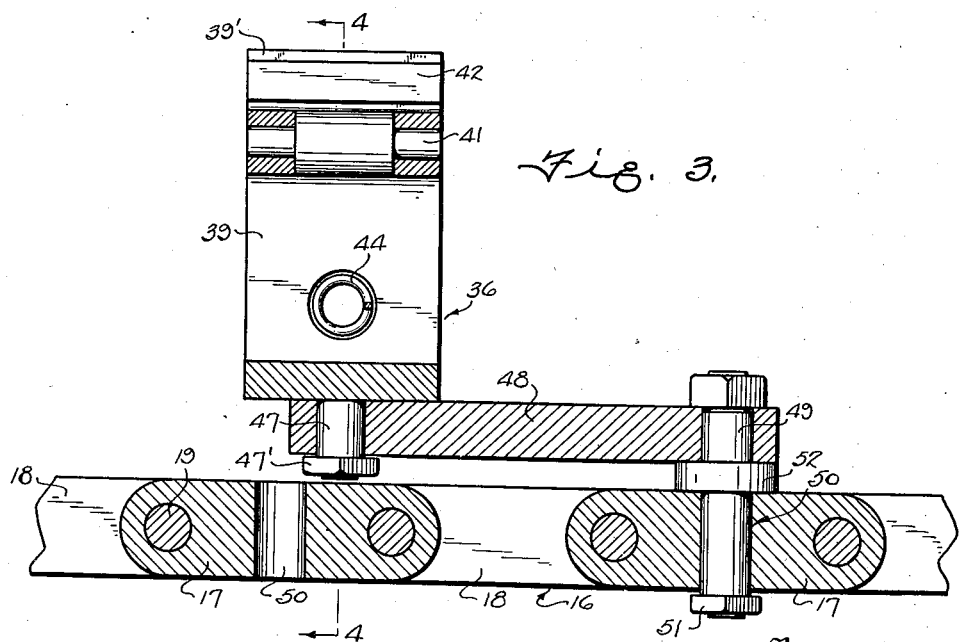
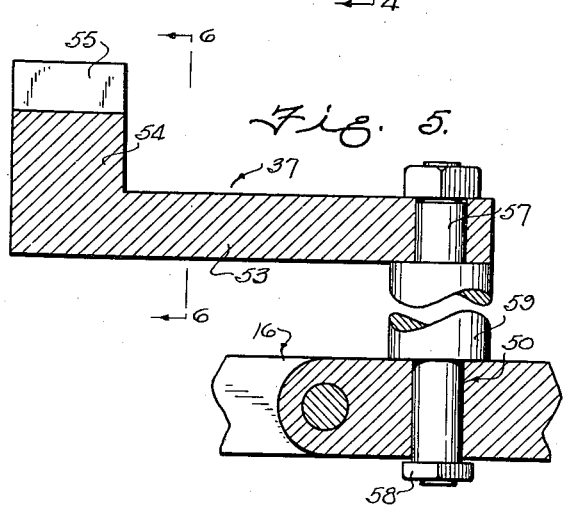
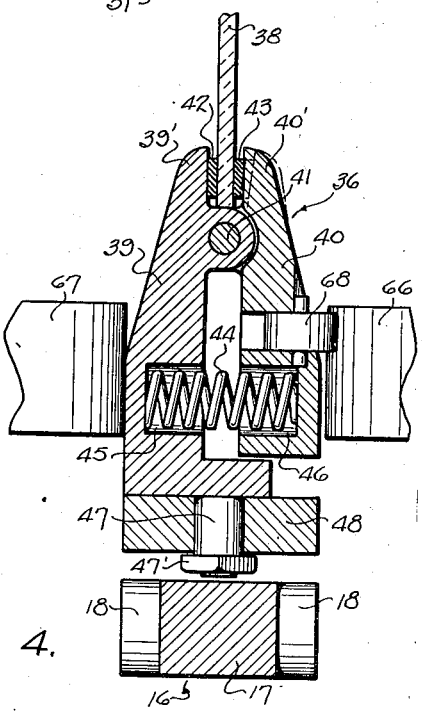
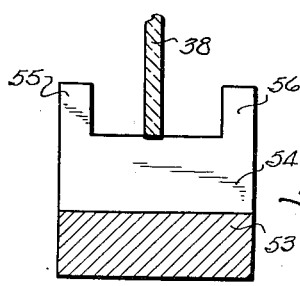
Inventor
CONRAD B. SCHAFER.
By Frank Fraser
Attorney Patented Aug. 25, 1942

2,293,858

UNITED STATES PATENT OFFICE 2,293,858

APPARATUS FOR WASHING SHEET GLASS

Conrad B. Schafer, Toledo, Ohio, assignor to Libbey-Owens-Ford Glass Company, Toledo, Ohio, a corporation of Ohio Application January 25, 1941, Serial No. 375,948

9 Claims. (Cl. 15—77)

The present invention relates broadly to the art of washing sheet glass and more particularly to apparatus for washing bent or curved sheets or plates of glass.

Although not limited to any specific use, this invention is of especial utility in the washing of glass sheets or plates which are to be used in the manufacture of bent or curved laminated safety glass. Briefly stated, laminated safety glass comprises two or more sheets of glass having one or more sheets of a suitable plastic strengthening material interposed therebetween and bonded thereto to provide a composite structure. When manufacturing this type of glass, it is necessary that the glass sheets be thoroughly and carefully washed and cleaned before they can be satisfactorily united to the interposed sheet or sheets of plastic strengthening material. In the event the glass surfaces to be united are not perfectly clean and free from all dirt, dust, and foreign matter, the bond between the laminations as well as the appearance of the finished composite sheet may be seriously affected.

The primary object of the invention is the provision of a novel apparatus for effecting a thorough and efficient washing of the glass sheets or plates which go into the making of bent or curved laminated safety glass, whereby to facilitate proper adhesion between the component parts of the laminated sheet and reduce to a minimum the percentage of rejects caused by insufficient and unsatisfactory cleaning of the glass.

Another important object of the invention is the provision of apparatus of the above character wherein the washing of the bent or curved sheets or plates of glass may be accomplished rapidly and conveniently in a substantially continuous manner as the said sheets or plates are carried forwardly in a substantially vertical position.

A further important object of the invention is the provision of washing apparatus of relatively cheap, simple construction and embodying means for supporting the bent or curved sheets or plates of glass in a vertical position and for carrying them forwardly during washing without placing any strain upon the glass whereby breakage thereof will be reduced to a minimum, said supporting means also presenting substantially no interference to the proper washing of the glass or to its inspection for defects after being washed.

Other objects and advantages of the invention will become more apparent during the course of the following description, when taken in connection with the accompanying drawings.

In the drawings, wherein like numerals are employed to designate like parts throughout the same:

Fig. 1 is a longitudinal horizontal sectional view of washing apparatus provided by the invention and in which the supporting means for the glass sheets or plates is shown in top plan;

Fig. 2 is a vertical longitudinal sectional view through a portion of the apparatus showing one of the washing brushes;

Fig. 3 is a vertical longitudinal sectional view through one of the clamp members for clampingly supporting the forward end of the glass sheet or plate;

Fig. 4 is a vertical section taken substantially on line 4—4 of Fig. 3;

Fig. 5 is a vertical longitudinal sectional view through one of the supporting members for freely supporting the rear end of the glass sheet or plate;

Fig. 6 is a vertical section taken substantially on line 6—6 of Fig. 5; and

Fig. 7 is a plan view of a portion of the apparatus.

With reference now to the drawings, there is illustrated in Fig. 1 a relatively long tunnel-type housing 10, the interior of which is divided by a pair of transverse partition walls 11 and 12 into three separate compartments or chambers 13, 14 and 15, preferably constituting respectively a detergent section, a rinse section and a condensate section. Extending longitudinally through the housing 10 is a horizontal endless conveyor 16 preferably in the form of a sprocket chain composed of the overlapping and interlocking links 17 and 18 pivotally connected together by the pintles 19. The sprocket chain 16 is trained at the opposite ends of its loop about sprockets 20 and 21 mounted upon horizontal shafts 22 and 23 respectively, each being journaled in spaced bearings 24 and 25. One of the sprockets, and as here shown sprocket 21, is positively driven by a suitable chain and sprocket drive or the like 26. The upper horizontal run or flight of the sprocket chain 16 is supported upon and slid along a longitudinally extending stationary rail 27 which prevents sagging of said upper run or flight of the chain as it moves forwardly.

Arranged within each of the compartments 13, 14 and 15 of the housing 10 is a pair of spaced vertical washing brushes 28 and 29 disposed at opposite sides of the endless conveyor 16 and mounted upon vertical parallel shafts 30 and 31 respectively. Each of said shafts 30 and 31 is journaled at its lower end in a bearing housing 32 and has keyed thereto a worm gear 33 driven from a worm 34 fixed to a drive shaft 35. It is preferred that the washing brushes 28 and 29 be rotated in the same direction as indicated by the arrows in Fig. 1 for a purpose to be more fully hereinafter described.

Carried at intervals along the length of the endless conveyor 16 are pairs of cooperating clamp members 36 and supporting members 37 for supporting the bent or curved sheets or plates of glass 38 to be washed in a vertical position. Each glass sheet or plate is clampingly supported at its forward end by one of the clamp members 36, while the opposite or rear end thereof is freely supported upon the supporting member 37.

Each clamping member 36 comprises a vertical stationary jaw 39 and a vertical movable jaw 40 which is pivotally associated with said stationary jaw and mounted upon a horizontal pin 41 carried thereby adjacent its upper end. The forward end of the glass sheet or plate 38 is clamped between the upper end portions 39' and 40' of the fixed and movable jaws 39 and 40, as best shown in Fig. 4; and preferably secured to the inner faces of the clamping portions 39' and 40' of the jaws are pads 42 and 43 respectively of felt, rubber, or other suitable cushioning material which will not mar or scratch the glass surfaces. The upper end 40' of movable jaw 40 is normally urged toward the upper end 39' of stationary jaw 39 to maintain them in glass clamping relation by means of an expansion spring 44 disposed between the jaws adjacent the lower ends thereof and received within recesses 45 and 46 formed in said jaws 39 and 40 respectively.

The stationary jaw 39 of the clamp member 36 has secured to the bottom thereof a vertical bolt 47 which passes loosely through an opening in the outer end of a horizontal arm 48 and is secured thereto by a nut 47'. In this way, the stationary and movable jaws 39 and 40 are permitted to freely rotate or swivel with respect to the arm 48. The horizontal arm 48 is also swiveled at its inner end upon the upper end of a vertical bolt 49 which passes downwardly through an opening 50 in one of the links 17 of the endless conveyor 16 and is secured thereto by a nut 51. The horizontal arm 48 is suitably spaced above the endless conveyor 16 by means of a shim or washer 52 carried upon bolt 49.

Each supporting member 37 comprises a substantially horizontal arm 53 provided at its outer end with a block 54 for freely supporting the lower edge of the glass sheet or plate 38 thereupon. The block 54 is provided at its opposite side edges with spaced upstanding lips 55 and 56 which serve to prevent the glass sheet or plate from slipping off of said block. The horizontal arm 53 is swiveled at its inner end upon the upper end of a vertical bolt 57 which passes downwardly through the opening 50 in one of the links 17 of endless conveyor 16 and is secured thereto by a nut 58. The arm 53 is maintained in desired spaced relation above the endless conveyor 16 by a collar or sleeve 59 carried upon bolt 57.

In the operation of the apparatus, the upper run or flight of the endless conveyor 16 is moved continuously forwardly through the succeeding compartments 13, 14 and 15 of housing 10 and one of the bent or curved sheets or plates of glass 38 to be washed is supported in a vertical position upon each pair of clamp and supporting members 36 and 37, with the axis of bend of the sheet or plate extending parallel with the axes of rotation of the washing brushes 28 and 29. The forward end of the sheet or plate is clampingly engaged by the clamp member 36, while the rear end thereof is freely supported upon the supporting member 37. As the glass sheet is carried forwardly between each succeeding pair of washing brushes 28 and 29, the clamp and supporting members 36 and 37 will be free to swivel horizontally with respect to one another upon the endless conveyor 16 to accommodate themselves to the curvature of the glass sheet being washed. Likewise, the stationary and movable jaws 39 and 40 of clamp member 36 are free to swivel as a unit upon the horizontal arm 48. In this way, the glass sheet is caused to move through a curved path corresponding to the curvature thereof as it passes between each pair of washing brushes 28 and 29, whereby successive opposite surface portions of the sheet contacted by the brushes will always be disposed substantially parallel with respect to said brushes. Due to such an arrangement, a thorough, efficient washing of the opposite surfaces of the glass sheet can be accomplished without placing any strain upon the glass which might tend to cause breakage thereof. Also, since the glass sheet is freely supported at its rear end upon the block 54, it is free to move laterally upon said block within limits defined by the lips 55 and 56.

The glass sheets or plates 38 are carried continuously forwardly first through the detergent section 13, then through the rinse section 14, and finally through the condensate section 15. In the first section 13, the glass sheets are adapted to be washed by means of the brushes 28 and 29 and a suitable detergent solution which may be directed upon opposite surfaces of the sheet from spray pipes or the like 60 and 61. One form of detergent which may be used comprises a solution of water, soap, and a water softener (Calgon) to which may or may not be added a relatively small amount of soda ash as preferred. In the second section 14, the glass sheet is subjected to a brushing and rinsing operation with plain city water sprayed upon opposite surfaces of the sheet through pipes 62 and 63 or the like, while in the third or condensate section 15 the glass sheet is subjected to a secondary rinse by means of pure (distilled) water applied to the opposite surfaces of the sheet through spray pipes or the like 64 and 65.

In order to facilitate the positioning of the glass sheets or plates 38 upon the supporting members 36 and 37 and their subsequent removal therefrom, there is preferably provided at the forward or loading end of the apparatus and also at the opposite or unloading end thereof a pair of spaced horizontal cam rails 66 and 67 arranged parallel with respect to one another and between which the clamp and supporting members 36 and 37 are passed. The forward end portions of the cam rails 66 and 67 can be curved outwardly away from one another as shown in Fig. 7 to guide the clamp and supporting members therebetween. Carried by the movable jaw 40 of each clamping member 36 is a freely rotatable roller 68 projecting slightly beyond said jaw and adapted to engage the cam rail 66. Thus, as the clamp member 36 passes between the cam rails 66 and 67 the roller 68 will be urged inwardly, thereby moving the upper end 40' of movable jaw 40 away from the upper end 39' of stationary jaw 39 as indicated in broken lines in Fig. 4. The glass sheet can then be positioned between said jaws by the operator and held in such position until the roller 68 passes beyond the cam rails, at which time the upper ends of the jaws will be automatically urged into clamping engagement with the sheet by the spring 44. The operator can then release the glass sheet and it will be firmly clamped in place.

From the above, it will be readily seen that with the apparatus herein provided the handling of the glass sheets or plates during washing is reduced to a minimum. Also, that the apparatus is of relatively simple construction and that it can be operated rapidly and conveniently to effect a thorough and efficient washing of the glass. Furthermore, because the supporting members 36 and 37 are swiveled upon the endless conveyor the bent or curved sheets can be carried between the washing brushes without imposing any strain thereupon which might tend to break the same. Likewise, the means for supporting the sheets offers substantially no interference to the cleaning of the glass. After the glass sheets have been washed and cleaned they may also be carried by the apparatus through a suitable drying chamber and may also be carried on to a point where they can be inspected for defects. The means hereinabove provided for supporting the glass sheets also offers no interference to inspection of the glass for defects after the sheets have been washed and dried.

By rotating the washing brushes 28 and 29 in the same direction as indicated by the arrows in Fig. 1, a steadier and more even and uniform forward movement of the glass sheets or plates can be obtained. That is to say, if the two washing brushes were both rotated in the same direction as the travel of the glass sheet, they would tend to force the sheet ahead, whereas if they were both rotated in a direction opposite to the direction of travel of the sheet they would tend to retard the forward movement thereof. However, by rotating the brushes in the same direction, the two forces which tend to push the sheet ahead on the one hand and retard the forward movement thereof on the other will be offset or neutralized and in this way a smoother, steadier forward travel of the sheets will be effected.

While there has been illustrated in Fig. 1 a housing containing three pairs of washing brushes, it will be appreciated that the invention is not limited to the use of any particular number of washing brushes or to subjecting the sheets to any particular number of washing operations. Also, the method and apparatus herein disclosed is not restricted to the washing of glass sheets or plates, but may be employed in the washing of other sheet material.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for washing bent or curved sheets or plates of glass and the like, a horizontally disposed endless conveyor, a pair of vertical rotary washing brushes mounted at opposite sides of said conveyor and between which the sheet is adapted to be passed while supported in a vertical position upon said conveyor with its axis of bend extending parallel with the axes of rotation of said brushes, cooperating supporting members carried by said conveyor adapted to support the sheet adjacent its opposite ends, and means for mounting said supporting members upon said conveyor so that they are movable freely horizontally relative to one another to permit movement of the sheet through a curved path corresponding to the curvature thereof as it passes between said brushes whereby the succeeding opposite surface portions of said sheet contacted by said brushes will be maintained substantially parallel with respect to the said brushes.

2. In apparatus for washing bent or curved sheets or plates of glass and the like, a horizontally disposed endless conveyor, a pair of vertical rotary washing brushes mounted at opposite sides of said conveyor and between which the sheet is adapted to be passed while supported in a vertical position upon said conveyor with its axis of bend extending parallel with the axes of rotation of said brushes, a clamp member carried by said conveyor adapted to support the forward end of the sheet and for securing said sheet in place, a supporting member also carried by said conveyor adapted to freely support the rear end of said sheet, and means for swiveling said clamp member and supporting member upon said conveyor so that they are movable freely horizontally relative to one another to permit movement of the sheet through a curved path corresponding to the curvature thereof as it passes between said brushes whereby the succeeding opposite surface portions of said sheet contacted by said brushes will be maintained substantially parallel with respect to the said brushes.

3. In apparatus for washing bent or curved sheets or plates of glass and the like, a horizontally disposed endless conveyor, a pair of vertical rotary washing brushes mounted at opposite sides of said conveyor and between which the sheet is adapted to be passed while supported in a vertical position upon said conveyor with its axis of bend extending parallel with the axes of rotation of said brushes, a clamp member carried by said conveyor adapted to support the forward end of the sheet and comprising a pair of relatively movable jaws for clamping said sheet therebetween, a supporting member also carried by said conveyor adapted to freely support the rear end of said sheet, and means for pivotally connecting said clamp member and supporting member to said conveyor so that they are movable freely horizontally relative to one another to permit movement of the sheet through a curved path corresponding to the curvature thereof as it passes between said brushes whereby the succeeding opposite surface portions of said sheet contacted by said brushes will be maintained substantially parallel with respect to the said brushes.

4. In apparatus for washing bent or curved sheets or plates of glass and the like, a horizontally disposed endless conveyor, a pair of vertical rotary washing brushes mounted at opposite sides of said conveyor and between which the sheet is adapted to be passed while supported in a vertical position upon said conveyor with its axis of bend extending parallel with the axes of rotation of said brushes, a clamp member carried by said conveyor adapted to support the forward end of the sheet comprising a horizontal arm swiveled at its inner end to said conveyor and a pair of relatively movable jaws swiveled upon said horizontal arm at the outer end thereof for clamping said sheet therebetween, and a supporting member also swiveled to said conveyor adapted to freely support the rear end of said sheet, said clamp member and supporting member being movable freely horizontally relative to one another to permit movement of the sheet through a curved path corresponding to the curvature thereof as it passes between said brushes whereby the succeeding opposite surface portions of said sheet contacted by said brushes will be maintained substantially parallel with respect to the said brushes.

5. In apparatus for washing bent or curved sheets or plates of glass and the like, a horizontally disposed endless conveyor, a pair of vertical rotary washing brushes mounted at opposite sides of said conveyor and between which the sheet is adapted to be passed while supported in a vertical position upon said conveyor with its axis of bend extending parallel with the axes of rotation of said brushes, a clamp member swiveled to said conveyor and adapted to clampingly support the forward end of the sheet, and a supporting member comprising a horizontal arm swiveled at its inner end to said conveyor and provided at its outer end with a block for freely supporting the rear end of the sheet thereupon and having means for preventing said sheet from slipping off of said block, said clamp member and supporting member being movable freely horizontally relative to one another to permit movement of the sheet through a curved path corresponding to the curvature thereof as it passes between said brushes whereby the succeeding opposite surface portions of said sheet contacted by said brushes will be maintained substantially parallel with respect to the said brushes.

6. In apparatus for washing bent or curved sheets or plates of glass and the like, a horizontally disposed endless conveyor, a pair of vertical rotary washing brushes mounted at opposite sides of said conveyor and between which the sheet is adapted to be passed while supported in a vertical position upon said conveyor with its axis of bend extending parallel with the axes of rotation of said brushes, a clamp member carried by said conveyor adapted to support the forward end of the sheet comprising a horizontal arm swiveled at its inner end to said conveyor and a pair of relatively movable jaws swiveled upon said horizontal arm at the outer end thereof for clamping said sheet therebetween, and a supporting member comprising a horizontal arm swiveled at its inner end to said conveyor and provided at its outer end with a block for freely supporting the rear end of said sheet thereupon, said clamp member and supporting member being movable freely horizontally relative to one another to permit movement of the sheet through a curved path corresponding to the curvature thereof as it passes between said brushes whereby the succeeding opposite surface portions of said sheet contacted by said brushes will be maintained substantially parallel with respect to the said brushes.

7. In apparatus for washing bent or curved sheets or plates of glass and the like, a horizontally disposed endless conveyor, a pair of vertical rotary washing brushes mounted at opposite sides of said conveyor and between which the sheet is adapted to be passed while supported in a vertical position upon said conveyor with its axis of bend extending parallel with the axes of rotation of said brushes, a clamp member carried by said conveyor adapted to support the forward end of the sheet and comprising a pair of relatively movable jaws for clamping said sheet therebetween, a supporting member also carried by said conveyor adapted to freely support the rear end of said sheet, means for swiveling said clamp member and supporting member upon said conveyor so that they are movable freely horizontally relative to one another to permit movement of the sheet through a curved path corresponding to the curvature thereof as it passes between said brushes whereby the succeeding opposite surface portions of said sheet contacted by said brushes will be maintained substantially parallel with respect to the said brushes, and means disposed in the path of travel of said clamp member for opening the jaws thereof to permit the positioning of the glass sheet therebetween or its removal therefrom.

8. In apparatus for washing bent or curved sheets or plates of glass and the like, a horizontally disposed endless conveyor, a pair of vertical rotary washing brushes mounted at opposite sides of said conveyor and between which the sheet is adapted to be passed while supported in a vertical position upon said conveyor with its axis of bend extending parallel with the axes of rotation of said brushes, a clamp member carried by said conveyor adapted to support the forward end of the sheet and comprising stationary and movable jaws for clamping said sheet therebetween, a supporting member also carried by said conveyor adapted to freely support the rear end of said sheet, means for swiveling said clamp member and supporting member upon said conveyor so that they are movable freely horizontally relative to one another to permit movement of the sheet through a curved path corresponding to the curvature thereof as it passes between said brushes whereby the succeeding opposite surface portions of said sheet contacted by said brushes will be maintained substantially parallel with respect to the said brushes, spaced sationary cam rails disposed in the path of travel of the clamp member and between which said clamp member is carried, and means carried by the movable jaw of the clamp member and engaging one of said cam rails for moving said movable jaw away from the stationary jaw to permit the positioning of the glass sheet therebetween or its removal therefrom.

9. In apparatus for washing bent or curved sheets or plates of glass and the like, a horizontally disposed endless conveyor, a pair of vertical rotary washing brushes mounted at opposite sides of said conveyor and between which the sheet is adapted to be passed while supported in a vertical position upon said conveyor with its axis of bend extending parallel with the axes of rotation of said brushes, a clamp member carried by said conveyor adapted to support the forward end of the sheet and comprising stationary and movable jaws for clamping said sheet therebetween, a supporting member also carried by said conveyor adapted to freely support the rear end of said sheet, means for swiveling said clamp member and supporting member upon said conveyor so that they are movable freely horizontally relative to one another to permit movement of the sheet through a curved path corresponding to the curvature thereof as it passes between said brushes whereby the succeeding opposite surface portions of said sheet contacted by said brushes will be maintained substantially parallel with respect to the said brushes, spaced stationary cam rails disposed in the path of travel of the clamp member and between which said clamp member is carried, means carried by the movable jaw of the clamp member and engaging one of said cam rails for moving said movable jaw away from the stationary jaw to permit the positioning of the glass sheet therebetween or its removal therefrom, and means for automatically returning said movable jaw into glass clamping relation with said stationary jaw when the said clamp member passes beyond the said cam rails.

CONRAD B. SCHAFER.